United States Patent [19]

Tanenbaum

[11] Patent Number: 5,119,319
[45] Date of Patent: Jun. 2, 1992

[54] FULL-DUPLEX VIDEO COMMUNICATION SYSTEM

[75] Inventor: Richard Tanenbaum, New York, N.Y.

[73] Assignee: Options Unlimited Research Corp., Princeton, N.J.

[21] Appl. No.: 450,641

[22] Filed: Dec. 14, 1989

[51] Int. Cl.$^5$ .................. G06F 15/20; G06F 15/42
[52] U.S. Cl. ............................... 364/514; 364/518; 395/153; 395/155
[58] Field of Search ............. 364/514, 226.2, 239, 364/518, 521; 340/717, 825.08

[56] References Cited

U.S. PATENT DOCUMENTS

| | | | |
|---|---|---|---|
| 3,798,610 | 3/1974 | Bliss et al. | 364/200 |
| 4,112,414 | 9/1978 | Iscol et al. | 371/68.2 |
| 4,489,387 | 12/1984 | Lamb et al. | 364/514 |
| 4,525,779 | 6/1985 | Davids et al. | 364/200 |

*Primary Examiner*—Thomas G. Black
*Assistant Examiner*—Ellis B. Ramirez
*Attorney, Agent, or Firm*—Pennie & Edmonds

[57] ABSTRACT

Each terminal in a full-duplex communication system comprises a computer-controlled display screen such as a CRT, at least one input means such as a keyboard, a mouse or a light pen and bidirectional communication means through which the terminals are interconnected. Each communication means comprises a receiver for receiving display information received at the terminal from the remote terminal(s) and a transmitter for transmitting information to the remote terminal(s) where it is displayed. In accordance with the invention, each terminal also comprises control means which periodically read sits input means and communications means and uses the information contained therein to control the content of its display. Further, the control means at each terminal also provides to its transmitter instructions which are transmitted to the remote terminal to change the display at the remote terminal so that all the displays are the same. As a result of this arrangement, changes in the display that are made at the same time by the user at the local terminal and by the user at the remote terminal are entered on the display screens at both terminals at substantially the same time so far as is discernable by the users. As a result, not only can each user interact with the display but it is also possible for each user to interact with the other users through the display without having to wait for one user to complete his entry of information as in the prior art. As a result, truly interactive communication is possible through the display.

42 Claims, 13 Drawing Sheets

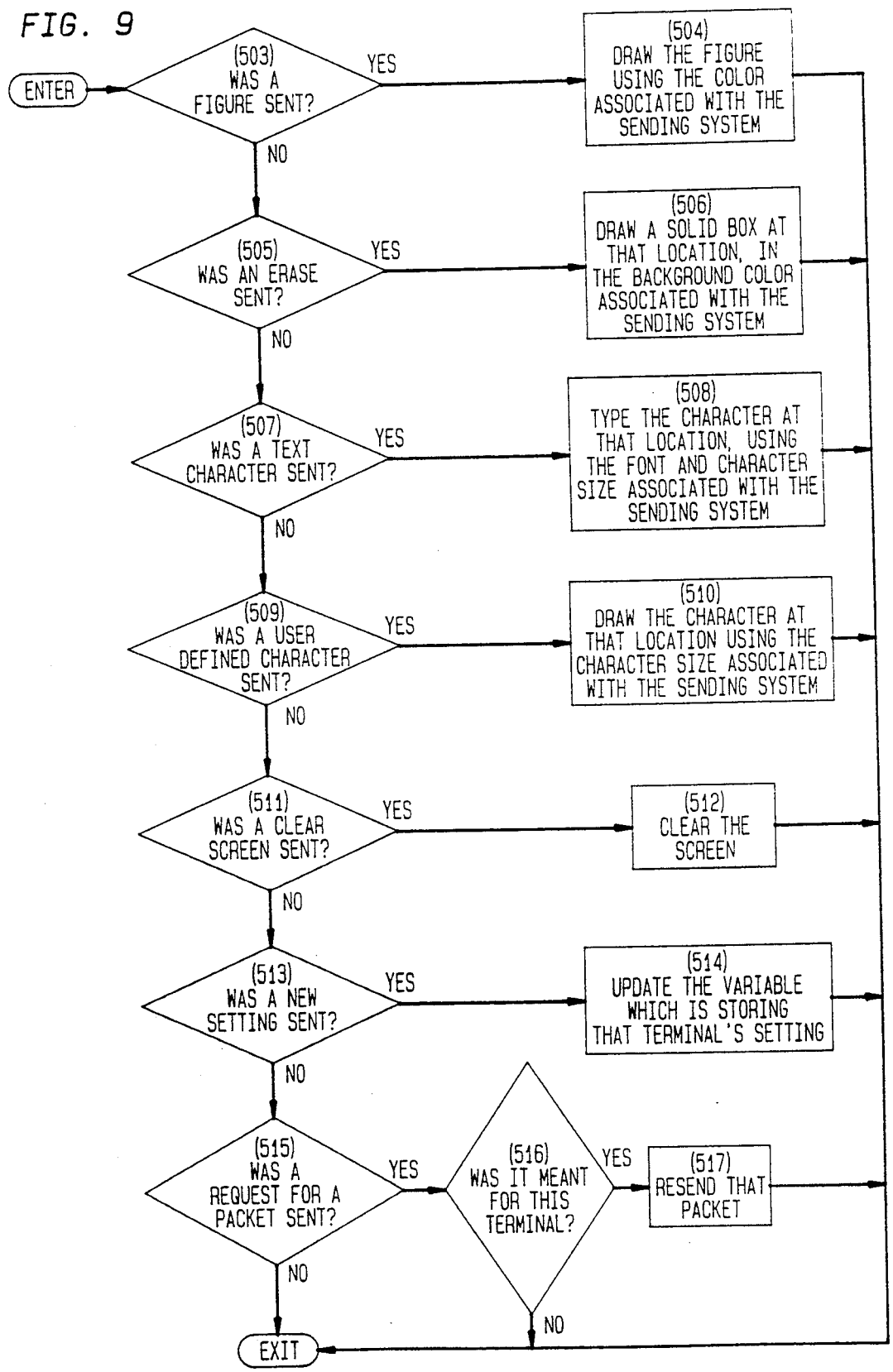

FULL-DUPLEX VIDEO COMMUNICATION SYSTEM

BACKGROUND OF THE INVENTION

This relates to the display of information and, more particularly, to a method and apparatus for creating substantially identical simultaneously interactive displays at two or more communication terminals. It also relates to a method and apparatus for correcting communication errors that is especially useful in such a system.

In a conventional computer terminal, a computer user interacts with the computer generated display by means of input devices such as a keyboard, a mouse, a light pen or the like. Typically, the keyboard or mouse controls some form of indicator or cursor which marks the location on the display at which the user may enter data using suitable keystrokes or mouse controls. While the operation of a light pen is considerably different, it too can be used to identify a location on the display and to control the entry of information at that point.

Situations frequently arise where it is desirable to communicate by means of a display. This can be done by transmitting the image of a display screen from one computer terminal to another. In addition, it is possible to arrange the communication so that one computer terminal controls the other terminal in a master-slave relation so that the same information is displayed on the display screens of both terminals. Such a system, however, has the disadvantage that the display is controlled solely by the user at the master terminal. As a result, communication is purely a one-way affair. By analogy to a conventional data communication system, such a system may be referred to as a simplex system.

Systems have been developed to provide for two-way communication via a display. For example, a Shareware program, Draw2Me, permits users at two terminals to interact with the same display at different times. In this system, the same display is generated at each terminal and each user controls an indicator or cursor that identifies the location on the screen where he can enter information. However, only one user at a time is allowed to enter information; and the second user is simply locked out until the first user is finished. By analogy to a conventional data communication system, this system may be referred to as a half-duplex system since it permits two-way communication but only one way at a time.

Other systems, such as Carbon Copy, do not lock out the second user. However, since either user can only enter data at one common point on the screen on a first-come first-served basis, the resulting display will be gibberish unless the users adopt a verbal communication protocol which permits only one of them to access the screen at a time. For all practical purposes, this system of communication is only one way at a time.

SUMMARY OF THE INVENTION

The present invention is a full duplex system which permits two or more users at different terminals to interact simultaneously with the same display.

In a preferred embodiment of the invention, two or more functionally similar communications terminals are interconnected by a communication line. Each terminal comprises a computer-controlled display screen such as a CRT, at least one input means such as a keyboard, a mouse or a light pen and bidirectional communication means through which the terminals are interconnected. Each communication means comprises a receiver for receiving display information received at the terminal from a remote terminal and a transmitter for transmitting information to the remote terminal or terminals where it is displayed. In accordance with the invention, each terminal also comprises control means such as a microprocessor and a computer program which periodically reads its input means and communications means and uses the information contained therein to control the content of its display. Further, the control means at each terminal also provides to its transmitter instructions which are transmitted to the remote terminal(s) to change the display at the remote terminal(s) so that all the displays are the same. In contrast to the prior art, however, each terminal controls the location on the display screen where its own input information is displayed.

As a result of this arrangement, changes in the display that are made at the same time by the user at the local terminal and by the user at the remote terminal(s) are entered on the display screens at all terminals at substantially the same time so far as is discernable by the users, with no gibberish. As a result, not only can each user interact with the display but it is also possible for each user to interact with the other user(s) through the display without having to wait for one user to complete his entry of information as in the prior art. As a result, truly interactive communication is possible through the display. Additional features of the invention include error control procedures, which facilitate the interaction between the users.

BRIEF DESCRIPTION OF DRAWING

These and other objects, features and advantages of the invention will be more readily apparent from the following detailed description of a preferred embodiment of the invention in which:

FIGS. 3–10 are flowcharts depicting details of the flowchart of FIG. 2.

DESCRIPTION OF PREFERRED EMBODIMENT OF THE INVENTION

Figure 1:
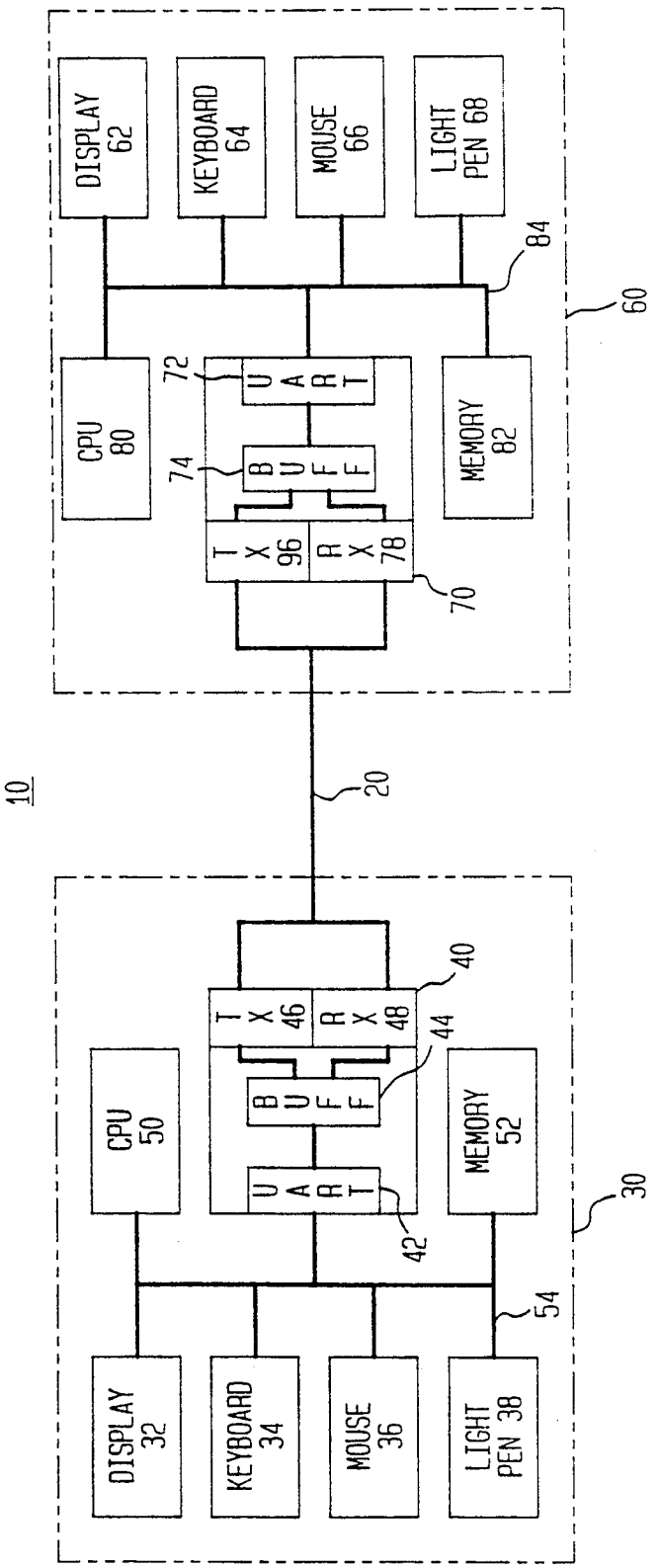
FIG. 1 is a block diagram depicting a preferred embodiment of the invention.

As shown in FIG. 1, a preferred embodiment of the apparatus of the present invention is a communication system 10 comprising a communication line 20, and at least first and second functionally similar communication terminals 30, 60. Communication terminal 30 comprises a display means 32 such as a CRT, input means such as a keyboard 34, a mouse 36 or a light pen 38, and a communication port 40. The communication port comprises a universal asynchronous receiver transmitter (UART) 42, a communications buffer or queue 44, a modem transmitter 46, and a modem receiver 48. The terminal also comprises a control means such as a central processing unit (CPU) 50 and a memory 52 and an internal communication means 54 such as address, data and control bus. Communication terminal 60 is identical and contains the same elements for which the identifying numerals have been increased by 30.

Each of the foregoing elements 32–54 or their equivalent is available in any number of commercially available personal computers such as those manufactured by IBM, Apple and numerous others. Details of the IBM PC and PC/AT personal computers are described, for example, in the *IBM Technical Reference Manual* for those computers and in any number of technical references such as M. Sargent III et al., *The IBM PC from the Inside Out* (Addison Wesley, 1986) which are incorporated herein by reference. Details of the personal computers manufactured by others are typically set forth in the owner's manuals for those computers. It will be understood that the configuration set forth in FIG. 1 is only illustrative of the various configurations of communications terminals that may be used in the practice of our invention and that numerous other configurations may be used.

In accordance with the invention, each of the terminals in system 10 (e.g., terminals 30, 60) is controlled by a functionally similar computer program stored in the memory (e.g., memories 52, 82) of that terminal. At each terminal, each program causes the terminal CPU to repeatedly read in succession the inputs from the keyboard, the mouse, the light pen and the communication means and to generate displays on the display screen in response to these inputs. Under control of these programs, the terminals operate independently and asynchronously of each other; but in accordance with the invention, display information from one terminal is communicated to each other terminal via the communication means so that all terminals generate substantially the same display at substantially the same time.

Communications between terminals use a message packet having the following format:

aaabbbcdef where a is the number of the message packet being transmitted, b is the number of the terminal from which the packet is transmitted, c is an identifier of the type of message being sent, d is the data of the message, e is an error control code (such as a checksum) and f is a character identifying the end of the packet. Illustratively, a, b, c, e and f are each eight or sixteen bits in length. The length of d varies with the format of the message data which is specified by the value of c. The number of the terminal need only be used if more than two terminals are interconnected. The number of the message packet (a) and, if more than two terminals are used, the number of the terminal (b) from which the packet is sent, are repeated several times (illustratively, three), so as to minimize the effect of any errors arising from line noise and the like. If the packet arrives garbled as determined by an error checking procedure, the packet can be sent again as long as the message packet number and, if necessary, the terminal number can be identified accurately. Redundant transmission of such identification is used to minimize the chance of errors that would prevent identification of the packet.

Figure 2:
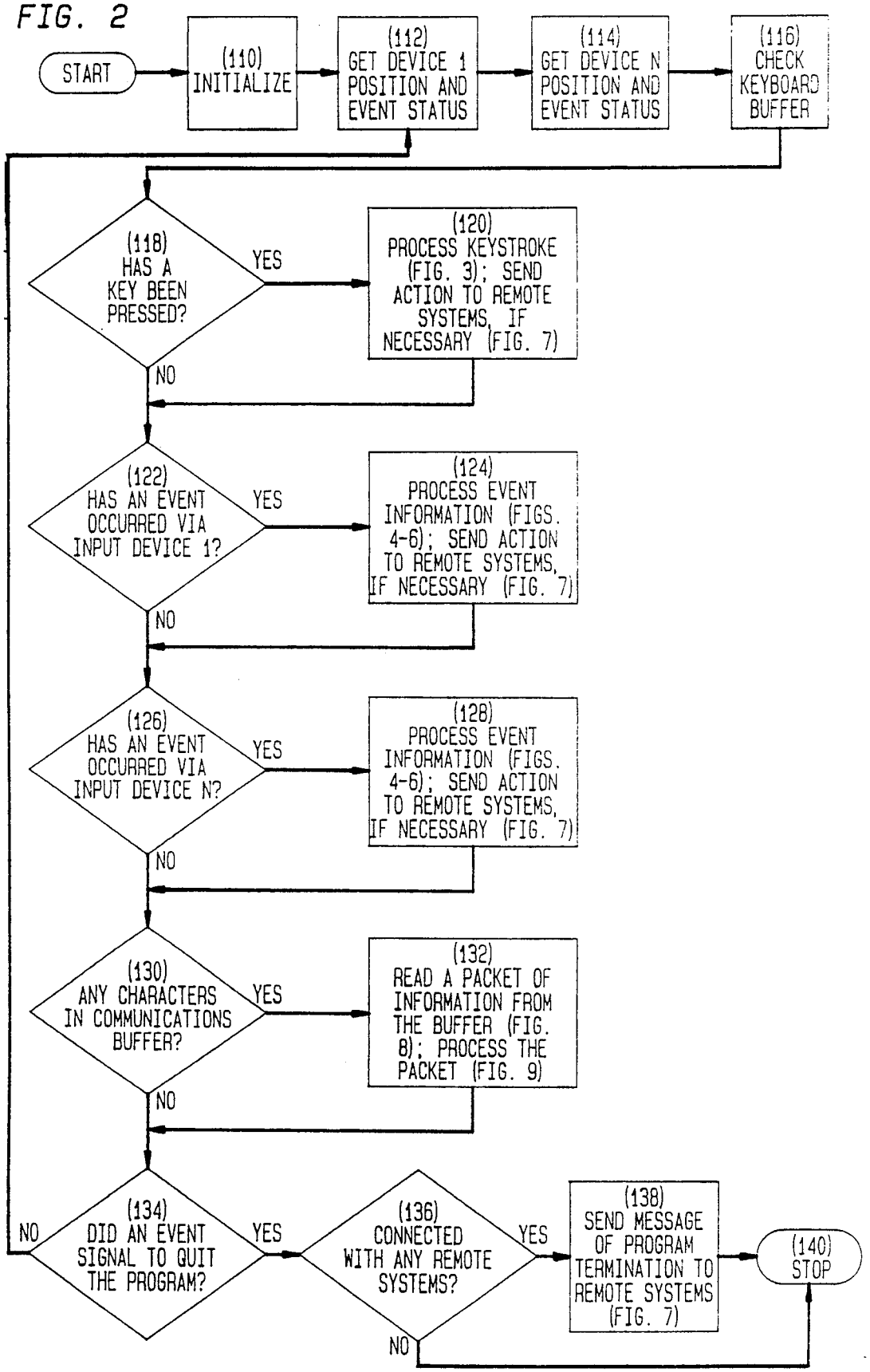
FIG. 2 is a flowchart depicting a preferred embodiment of a computer program used in the practice of the invention.

A flow chart depicting the general operation of the program that operates at each terminal is set forth in FIG. 2. More detailed flow charts depicting various aspects of the flow chart of FIG. 2 are set forth in FIGS. 3-10. While the programs that operate each of the terminals may be the same, the functions that are depicted in the flow charts can in fact be implemented in many different ways and differences in implementation will inevitably arise if the terminal equipment is different.

To begin a communication session between two or more terminals 30, 60, users at each terminal establish communications with each other via communication line 20 and the communication means of each terminal using conventional procedures. They then commence operation at each terminal of the program that is flowcharted in FIG. 2 by initializing the program (box 110).

As shown in FIG. 1, each terminal has connected to it a series of input devices such as a mouse, a light pen, a touch pad or a touch screen. For each such device 1 through n, the program determines the position on the display screen to which the device is then pointing (e.g., a cursor position) and the status of the controls associated with that device by reading input buffers associated with these devices. Illustrative status events are that a button on the mouse is depressed, or a portion of the touch screen or touch pad is touched.

Next, the program checks a keyboard buffer (box 116) which receives from the keyboard signals representing a keystroke, and it tests if a key has been selected (box 118). If it has, the program processes the keystroke as shown in more detail in FIG. 3 and, if the keystroke affects the display, forwards information concerning this keystroke to the remote terminal(s) (box 120). The program then tests if any status event has occurred at the first input device (box 122). If it has, it processes this event as shown in FIG. 4 and, if necessary, transmits information concerning this event to the remote terminal (box 124). In like fashion, the program tests every other input device through device n and processes their status events (boxes 126, 128).

Next, the program tests if the communication buffer 44 contains any input signals (box 130). If it does, the program reads these signals from the buffer and processes them as set forth in more detail in FIGS. 7 and 8 (box 132). Finally, it tests if any of the status events specified termination of the program (box 134). If they did not, it recycles to box 112 and commences again to read each of the input buffers and to process any signals therein. If, however, the program received an instruction to terminate the program, it tests if a connection with a remote terminal was ever established (box 136); and if so, sends a message to the remote terminal or terminals instructing it to terminate operations (box 138). Finally, the program stops execution (box 140).

Figure 3:
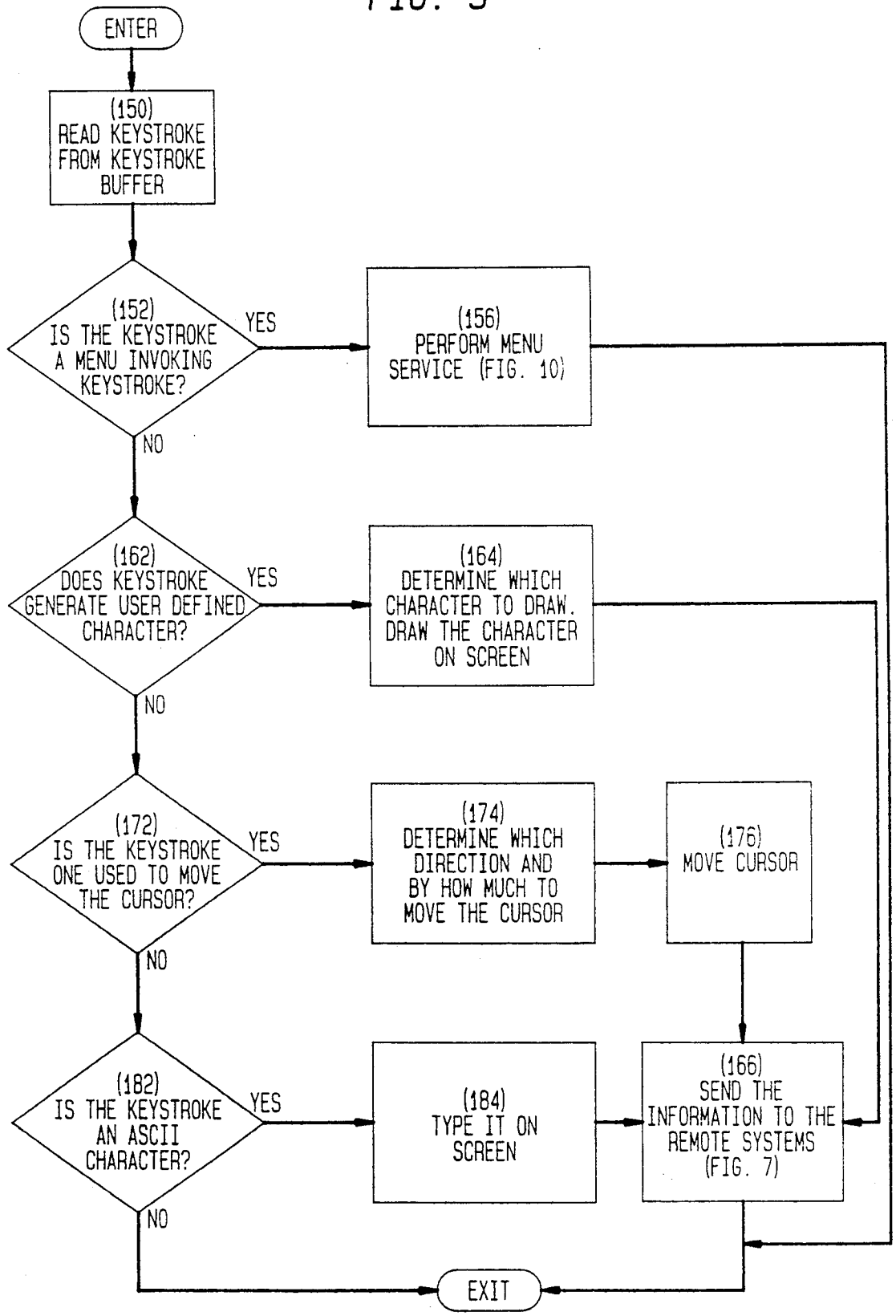
Figure 4:
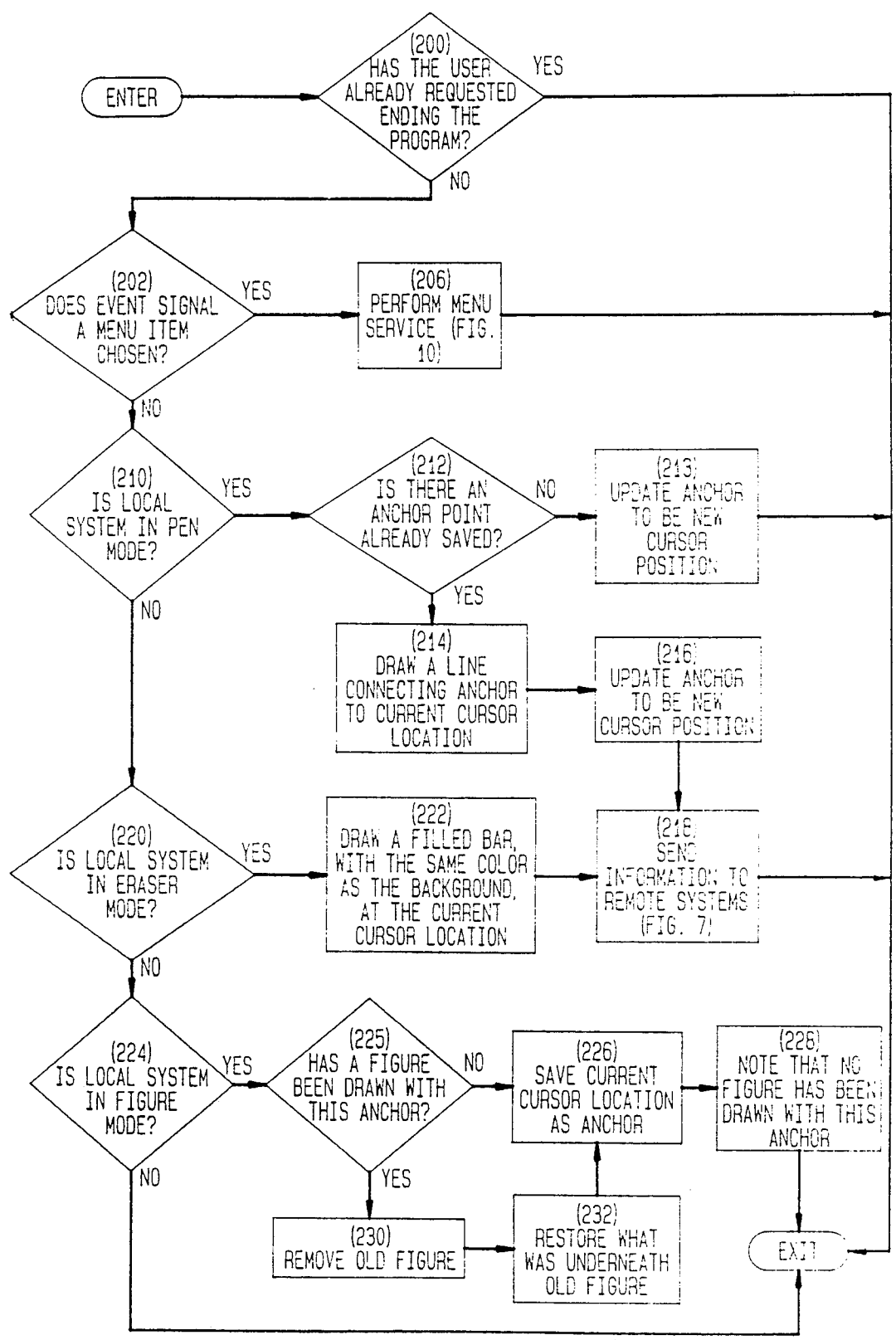

FIG. 3 discloses details of a routine for the processing of a keystroke. Illustratively, there are four categories of keystrokes: menu invoking, user defined character, cursor control and character. As shown in FIG. 3, the keystroke is first read from the keystroke buffer (box 150). The keystroke is then tested to determine if it is a menu invoking keystroke (box 152). If it is, the menu service is then performed as described in more detail in FIG. 9 (box 156). If the keystroke is not a menu invoking keystroke, a test is made to determine if the keystroke is used to generate a user defined character (box 162). If it is, a determination is made as to which character is to be drawn and the character is drawn on the display screen (box 164) at the location of the cursor. Next, the same information as to the character to draw and its location on the display screen is transmitted to the remote terminal or terminals (box 166).

If the keystroke is not used to generate a user defined character, a determination is then made whether the keystroke is one of those keystrokes used to move the cursor such as a home key or an up, down, left or right arrow (box 172). If it is, a determination is made as to the direction to move the cursor and by how much (box 174). The cursor is then moved (box 176) and information concerning movement of the cursor is then sent to the remote terminal(s) (box 166). This permits each terminal to display all the cursors being used at the different terminals.

If the keystroke is not one used to move the cursor, the keystroke is tested to determine if it is an ASCII character (box 182). If it is, it is displayed on the screen (box 184) at the location of the cursor; and the character and its location are also sent to the remote terminal (box 166).

Figure 5:
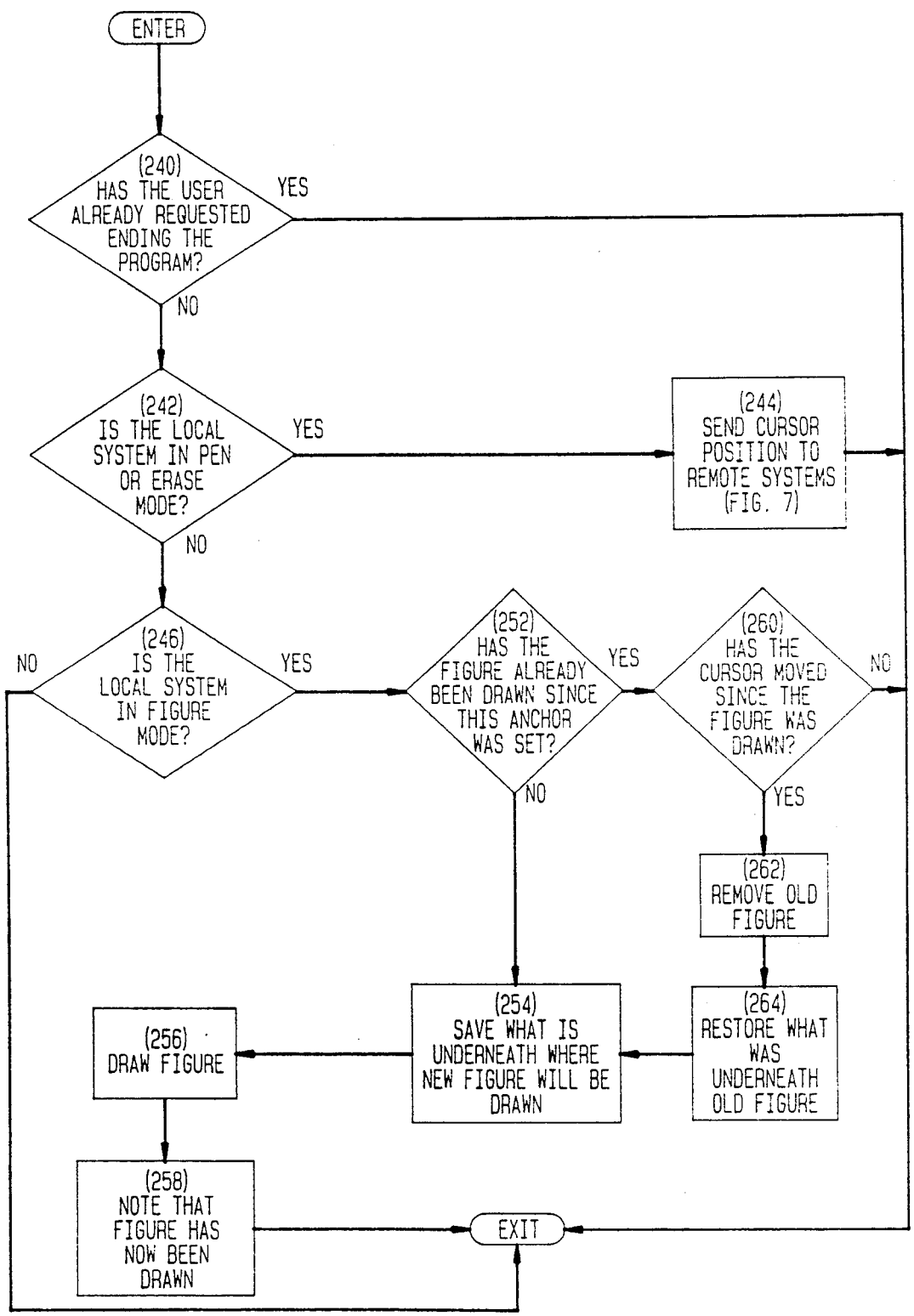
Figure 6:
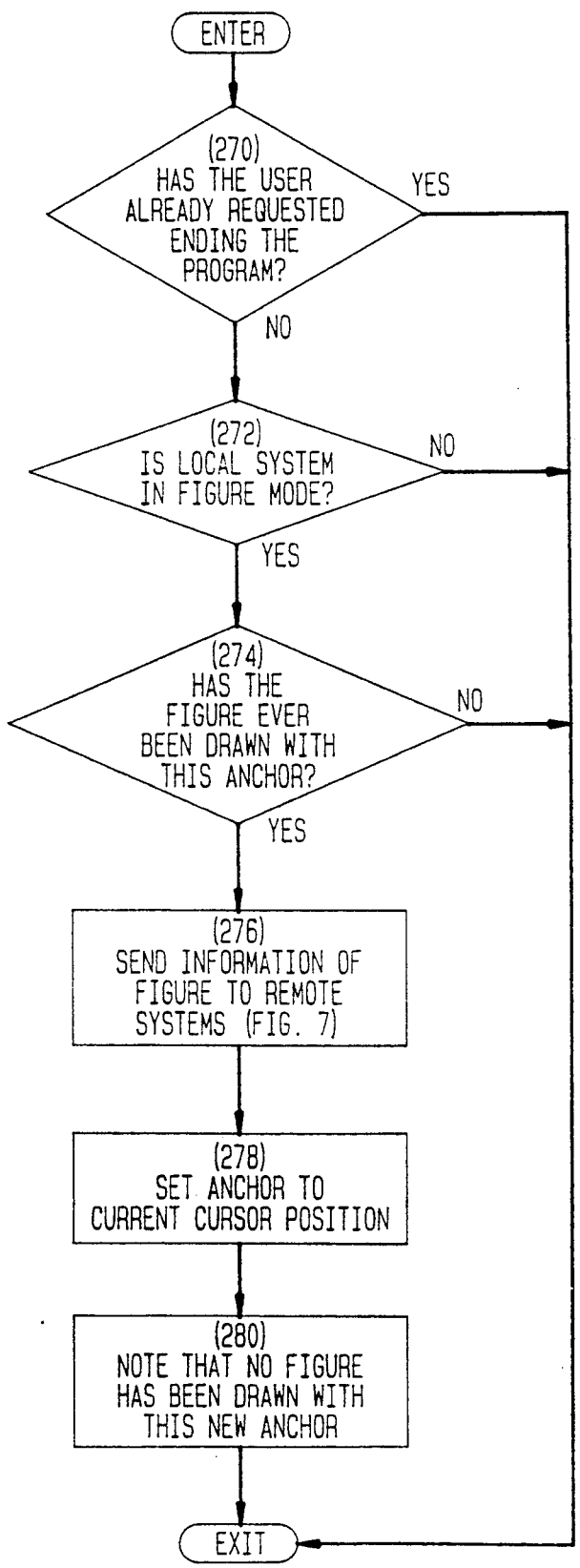

Routines for the processing of illustrative event information are set forth in FIGS. 4, 5 and 6. The routine of FIG. 4 illustrates the processing that occurs when the left button of a mouse device is clicked. This operation is used to set an anchor point on a display which is the point where a drawing commences. The routine begins by testing if the user has already requested termination of the program (box 200) and terminating the routine if he has. If he hasn't, the routine tests if the event signals the selection of a menu item (box 202). If it does, it performs menu service as described in more detail in FIG. 10 (box 206).

If a menu item has not been chosen, the routine tests which mode the local system is in (boxes 210, 220, 224). For purposes of illustration, the flowchart depicts the processing that is performed for the three modes: pen, eraser, figure. In pen mode, the input device is used to draw freehand like a pen on paper. This is accomplished by drawing a line from an anchor point to the current cursor location and then making the current cursor location be the anchor point. In the eraser mode, part of the screen is erased by drawing a small box at the cursor location and filling it with the background color. In the figure mode, the input device draws a geometric figure such as a box or a circle using the anchor point and the cursor location to specify the location and dimensions of the figure.

If the local system is in pen mode (box 210), the program tests if an anchor point has already been saved (box 212). If it hasn't, it sets a new anchor point at the current cursor location (box 213). If it has, the program draws a line on the display screen connecting the anchor to the current cursor location (box 214). It then updates the anchor point so that it is the new cursor location (box 216) and transmits instructions to the remote terminal(s) instructing them to draw a line connecting the anchor point to the current cursor location.

If the local system is in the eraser mode (box 220), it will draw a filled bar having the same color as the background at the current cursor location (box 222); and it will send instructions to the remote terminal(s) to do the same (box 218).

If the local system is in the figure mode (box 224), it tests whether a figure has been drawn with the current anchor point (box 225). If no figure has been drawn, the routine saves the current cursor location as the anchor point (box 226) and notes that no figure has been drawn with this anchor point (box 228). If a figure has been drawn, the routine removes the old figure (box 230), restores whatever was underneath the old figure (box 232), saves the current cursor location as the anchor point (box 226) and notes that no figure has been drawn with this anchor point (box 228). These operations provide a "rubber-banding" feature in which a new sketch can be superimposed and moved over an old figure with the old figure disappearing and reappearing as the new sketch is moved across it.

FIG. 5 describes a routine for processing information when the mouse is moved and neither button is pressed. It will be recalled that movement of the mouse causes the cursor to move on the display screen. Again, a test is made if the user has already requested termination of the program (box 240); and if he hasn't, a test is made as to which mode the local system is in (box 242, 246). If the system is in either the pen or eraser modes (box 242), the cursor position is sent to the remote terminal (box 244). If the system is in the figure mode (box 246), the movement of the cursor controls the dimensions of a figure which either has been or is being drawn on the display at that time. Accordingly, a test is made as to whether a figure has been drawn since the anchor was set (box 252). If the figure has not been drawn since the anchor was set, what is underneath the area where the new figure is to be drawn is saved (box 254). The figure is then drawn (box 256) and the fact that it has been drawn is noted (box 258).

If, however, the figure has already been drawn, a test is made whether the cursor has moved since the figure was drawn (box 260). If so, the old figure is removed (box 262) and what was under the old figure is restored (box 264). What was underneath the area where the new figure is to be drawn is then saved (box 254) and the routine continues as in boxes 256, 258.

The flow chart of FIG. 6 depicts a routine for processing information when the right button on the mouse device is clicked. Again, a test is made whether the user has requested termination of the program (box 270); and, if not, a test is made whether the local system is in the figure mode (box 272). If the system is in the figure mode, a test is made whether a figure has ever been drawn with the current anchor point (box 274). If so, information concerning the figure is sent to the remote terminal(s) (box 276); a new anchor point is set at the current cursor position (box 278); and a note is made that no figure has been drawn with this new anchor point (box 280) This processing of the event information then terminates. Likewise, if it is determined at box 274 that a figure has never been drawn with the old anchor point then the processing terminates.

Figure 7:
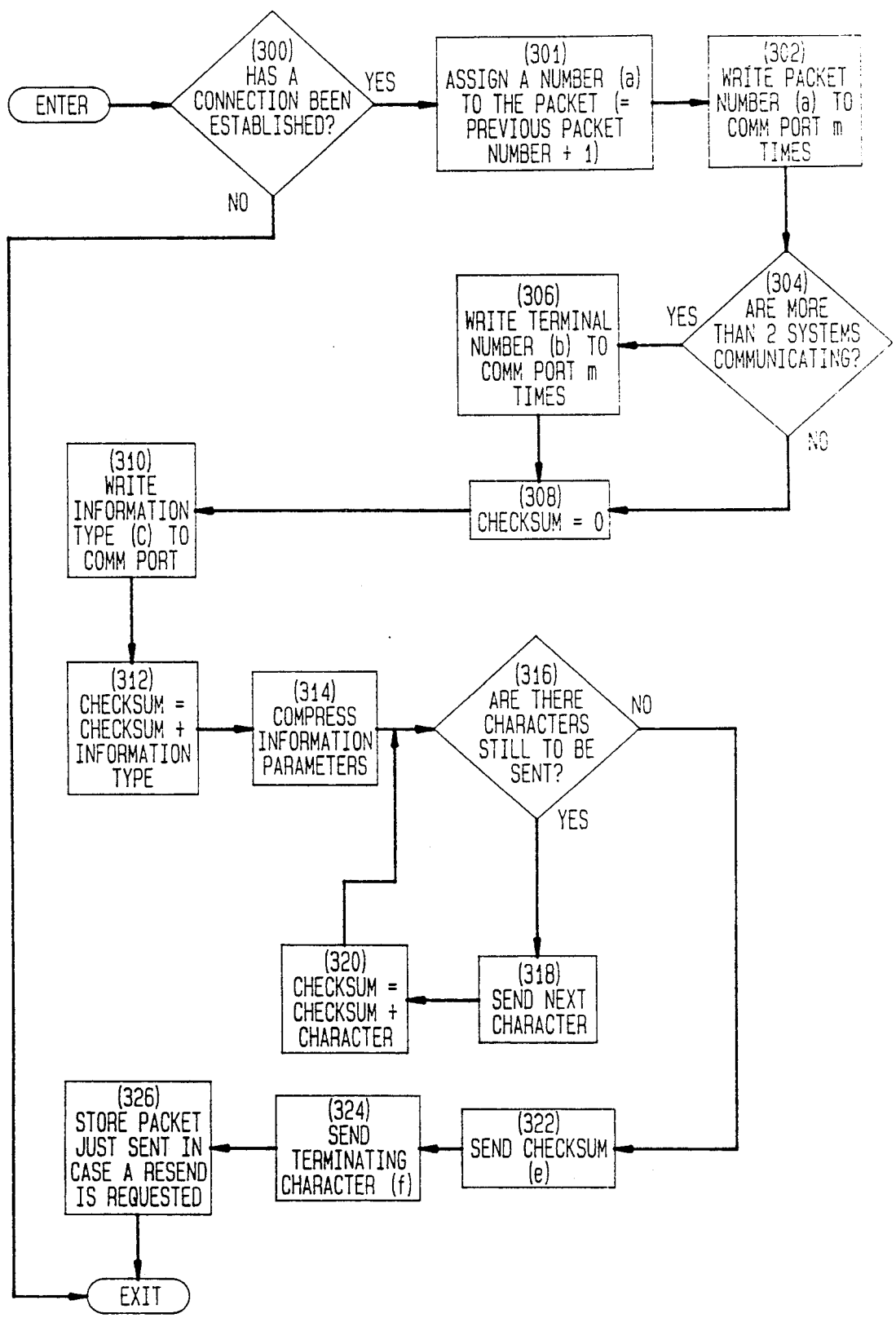

FIG. 7 describes the processing involved in transmitting information to a remote terminal. A test is first made of whether a connection has been made to a remote system (box 300). If it hasn't, the routine is exited. Otherwise, the routine begins the preparation of a packet. First, the routine assigns a number to the packet which is equal to the number of the previous packet plus 1 (box 301). In the present embodiment of the invention, this number is an eight bit binary number although a longer or shorter number could be used. The packet number (a) is then written to the communication port (box 302). Advantageously, the packet number is duplicated twice (box 302) so that three copies of the packet number are sent. A test is then made whether there are more than two terminals communicating (box 304). If so, the terminal number (b) is written to the communication port the same number of times as the packet number (box 306). A suitable memory which stores the value checksum is then set equal to zero (box 308).

An identification (c) of the type of information to be transmitted is then written to the communication port (box 310). This identification specifies the format of the remainder of the message packet, e.g., a character code and its location, or a graphic symbol and its location, and accordingly, also specifies the length of the remainder of the message packet. A new value of checksum is then computed by combining the original value of checksum with a value derived from the identification of the information to be transmitted (box 312). Advantageously, the information (d) to be sent is then data compressed (box 314) by a suitable data compression algorithm; and the encoded characters which result are provided to the communication port one character at a time. In transmitting the information, a test is first made as to whether there is information still to be sent (box 316). If so, the next character is sent (box 318) and checksum is increased by a numerical value related to this character (box 320). The test for characters to be sent continues until all are sent, at which point the value of checksum (e) is sent (box 322). Finally, the terminating character (f) is sent (box 324); and the packet is stored in case there is a request for retransmission (box 326).

Unlike message packet systems where only one packet is transmitted at a time and further transmission is suspended until proper receipt of that packet is acknowledged, the present invention permits packets to be transmitted continuously since the data in any improperly sent packet can be retrieved from the message packet store at the transmitting terminal. As will be apparent, since the packets are retrieved by their packet number, the maximum value of the packet number determines how many packets can be distinguished. This value should be large enough that any errors in the received message packets will become manifest in time to process a request to retransmit the message packet. In practice an eight bit packet number has been sufficient.

Different techniques known in the art can be used to provide the numerical values related to the characters that are used in computing checksum. For example, all or part of the binary values used to represent the character can be regarded as binary numbers and added to the binary value of checksum.

Figure 8A:
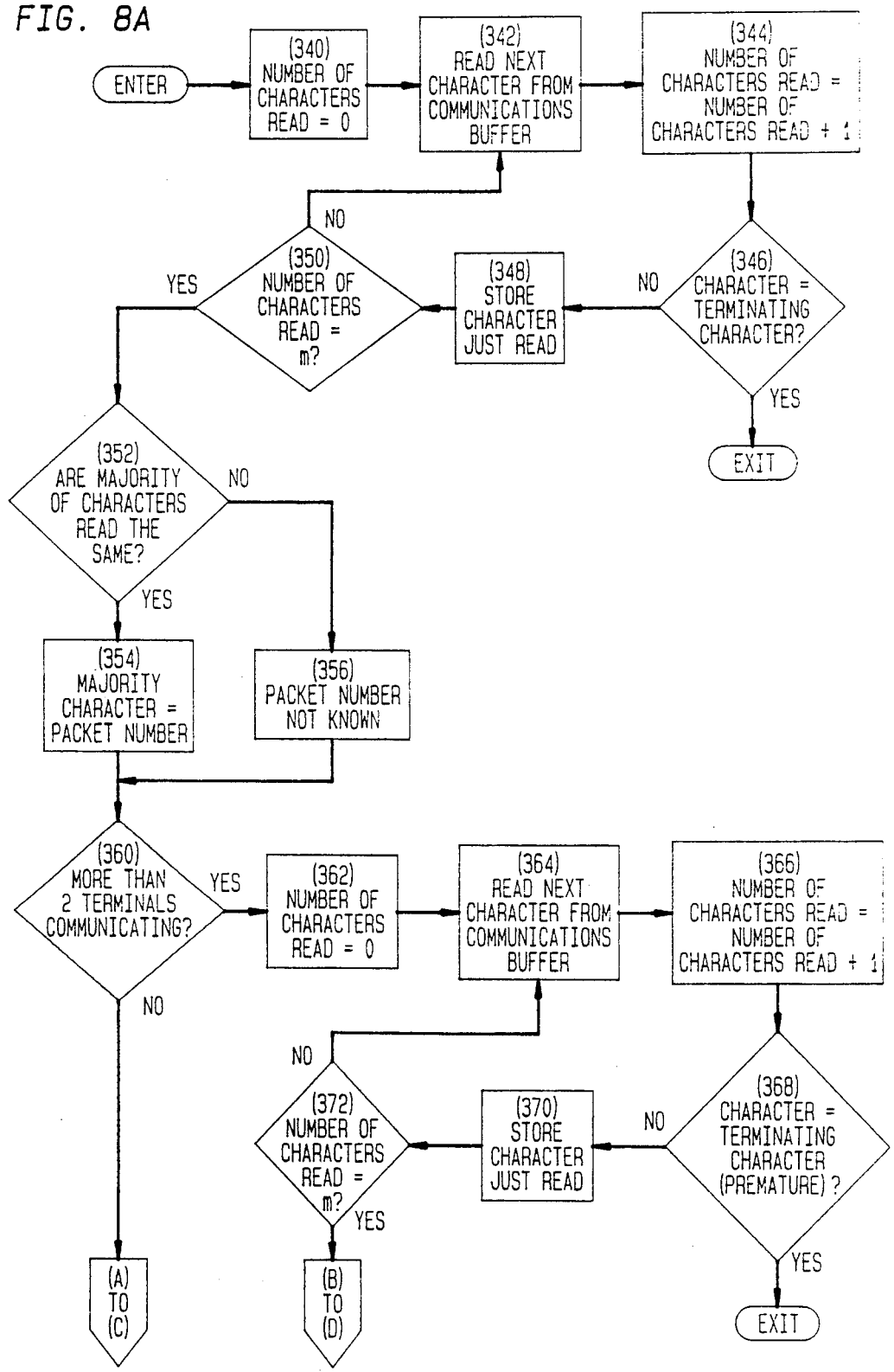
Figure 8B:
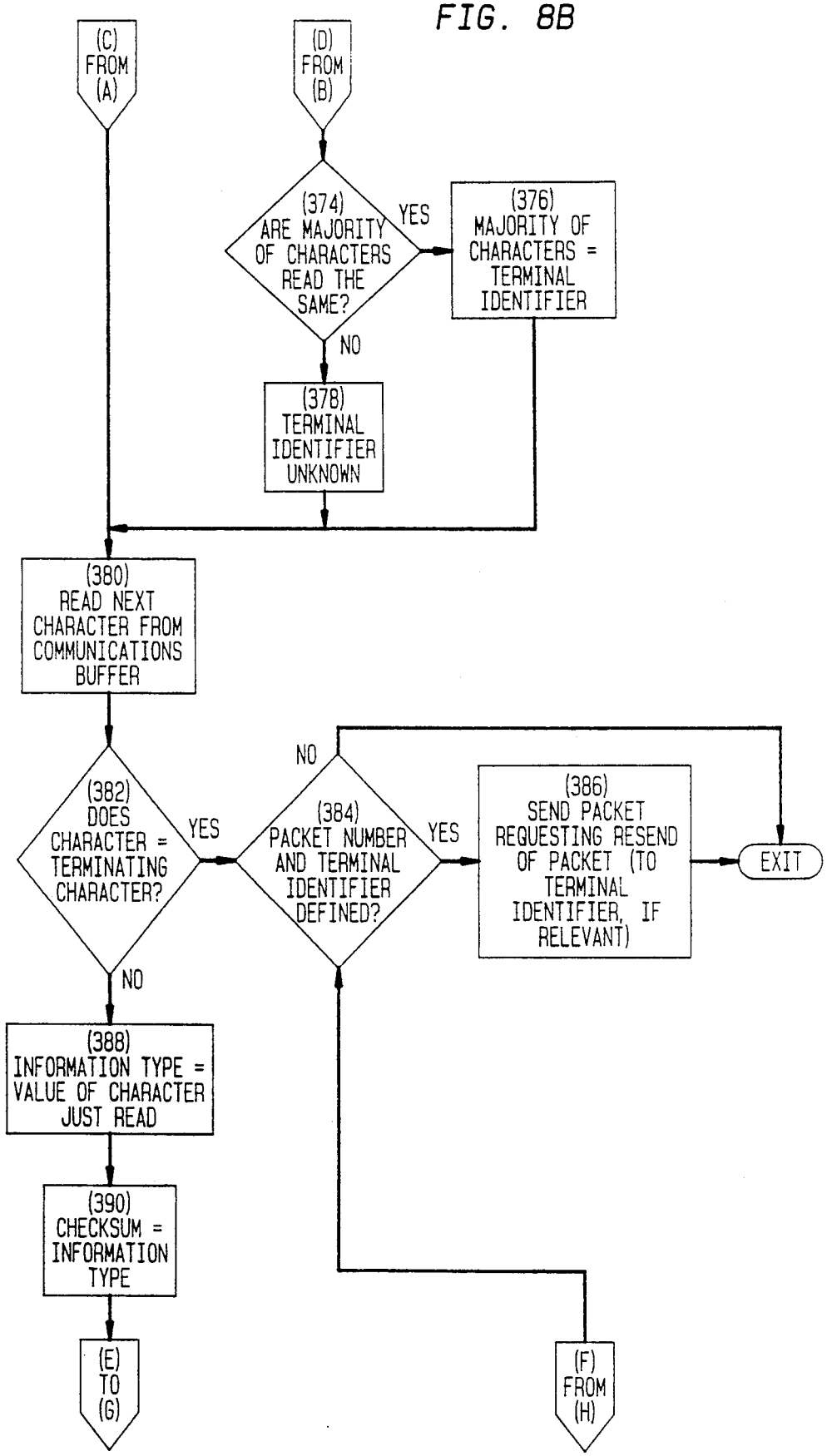
Figure 8C:
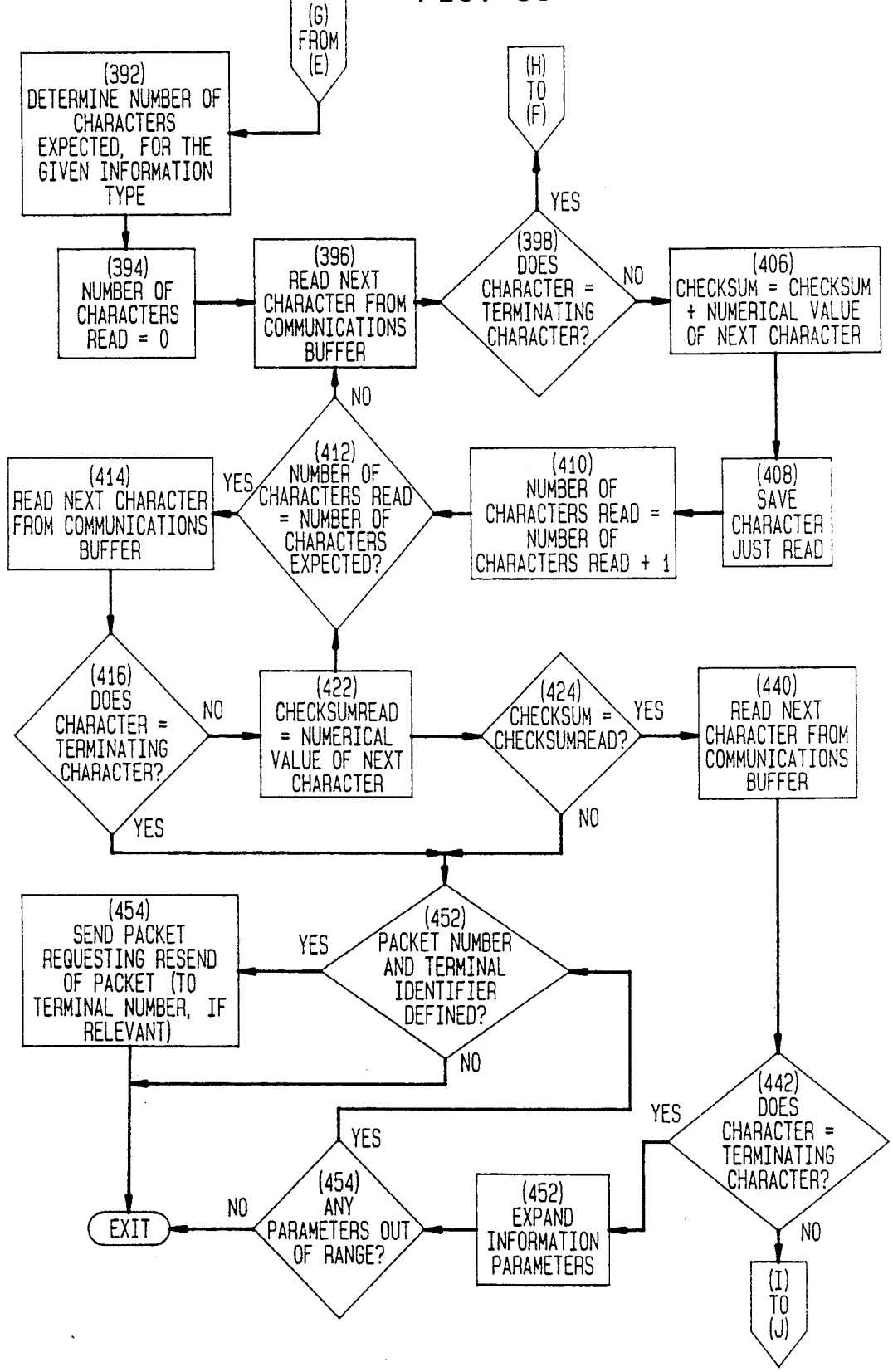
Figure 8D:
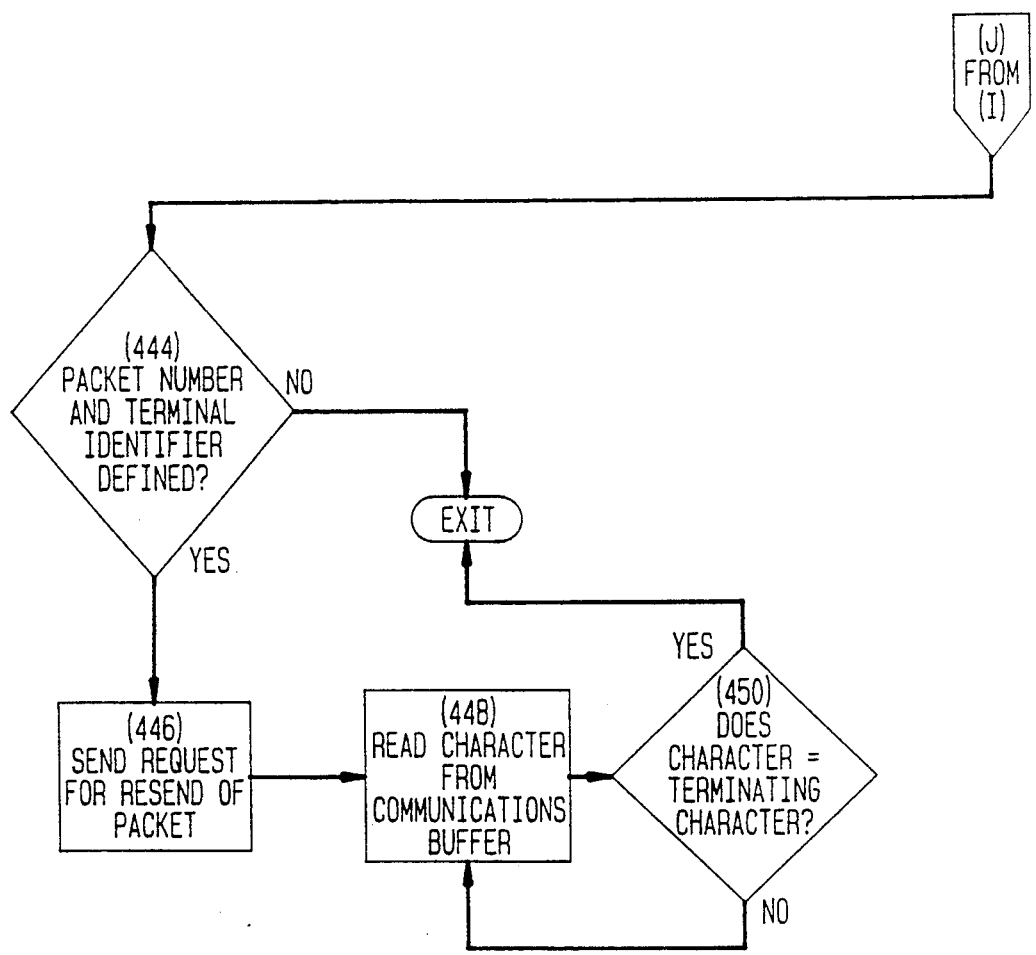

The routine for the processing of a received packet is set forth in FIGS. 8A, B, and C. This routine is initialized by setting equal to zero a counter which counts the number of characters read (box 340). Illustratively, each character comprises eight bits; and the packet number (a), terminal number (b), identification (c), checksum (e) and terminating character (f) are each one character long. The first character is then read from the incoming communications buffer (box 342). The character counter is then incremented by one (box 344) and a test is made as to whether the character is a terminating character that has been received prematurely (box 346). If so, the routine terminates. Otherwise, the character is stored (box 348). A test is then made of the character counter to determine if it has reached the maximum number m of repetitions of the packet number (box 350). If it hasn't, the next character is read from the incoming communications buffer (box 342) and the reading cycle continues.

After reading the last repetition of the packet number, the program tests whether the majority of characters that have been read are the same (box 352). If so, the majority character is the packet number and the value of the majority character is stored as the packet number (box 354). If not, then the packet number cannot be determined and is set to a null value (box 356). Next, the program tests if more than two terminals are connected to the communication line (box 360). If so, the program sets to zero a counter for the number of characters read (box 362) and reads the next character from the communications buffer (box 364). As in the case of reading the packet number in boxes 342-350, the program reads the next m successive characters and tests these characters to determine the value of the majority of the characters. If there is a majority, the value of the majority is the terminal identifier. Otherwise, the terminal identifier is not known and is set to a null value.

The program then reads the next character from the communications buffer (box 380) and tests this character to determine if it is a premature terminating character (box 382). If it is, it determines if the packet number and any terminal identifiers are defined (box 384). If so, it requests that the packet be sent again (box 386) and terminates this routine. If the character is not a terminating character, the character specifies the type of information being sent and a numerical value associated with that character is stored (box 388). The value of checksum is set equal to the value associated with the information type (box 390); and from the information type a determination is made of the number of characters expected in the remainder of the message packet (box 392).

A character counter is then initialized to zero (box 394) and a character is read from the incoming communications buffer (box 396). This character is then tested to determine if it is a premature terminating character (box 398). If it is, a test is made if the packet number and any terminal identifier are defined (box 384); and if so a request is made to resend the packet. If, however, the character is not a terminating character, the numerical value of the character is added to checksum (box 406); the character is saved (box 408) for subsequent decompression (box 452); and a character counter is incremented by one (box 410). The character counter is then tested to determine if it equals the number of characters expected for that message packet (box 412). If it doesn't, the program recycles to read another character from the communication buffer (box 396). If, however, the character counter has reached the number of characters expected, the routine moves on and the next character is read from the communications buffer (box 414).

That character is then tested to determine if it is a terminating character (box 416). If it is, the program requests that the packet number be sent again if the necessary information is available (boxes 452, 454). If the character is not a terminating character, the value of the character is loaded in a variable named checksumread (box 422). Next, a test is made whether the value of checksum equals checksumread (box 424). If it doesn't, a request is made, if possible, to resend the packet (boxes 452, 454). If the values of checksum and checksumread are the same, the next character is read from the communications buffer (box 440) and that character is tested whether it is correctly a terminating character (box 442). If it is not, a request is made, if possible, to resend the packet (boxes 444, 446); and to flush the communications buffer, characters are read from the communications buffer (box 448) until a terminating character is reached (box 450). If the test for a terminating character (box 442) is positive, the received characters are expanded (i.e. decompressed) (box 452) and the decompressed information is tested to determine if any is out of range (box 454). If it is not, transmission has been successful and this routine is terminated. Otherwise, a request is made, if possible, to resend the packet (boxes 452, 454).

FIG. 9 depicts the processing of the decompressed information in a received data packet. The packet is initially tested to determine what type of information was sent (boxes 503, 505, 507, 509, 511, 513, 515). If the information was a drawing of a figure (box 503), the type of figure and the coordinates of at least one point of the figure are transmitted with the message packet. Accordingly, the system then draws the figure starting at the coordinates specified (box 504). If erase was sent (box 505), again the coordinates of the erasure are specified by the message packet and the system erases by drawing a solid box at those coordinates using the background color (box 506). If text was sent (box 507), the packet contains a specification of the text and its coordinates as typed on the sender's screen. Accordingly, the character is typed at that location using the font and character size specified by the sending system (box 508). If a user defined character was sent (box 509), it is drawn to correct size at the location specified in the message packet (box 510). If a command is received to "clear the screen" (box 511), that is done (box 512). If a command affects the setting of variables such as character size or font selection (box 513), the receiving terminal updates the appropriate variables (box 514). If the command is a request to resend a packet (box 515), the packet number is specified in the request. If more than two terminals are connected, a check is made to see if this resend request is meant for the local system (box 516). If it is, then the packet can be retrieved by the transmitting terminal and sent again (box 517) since the packet was stored at the time it was sent.

Figure 10:
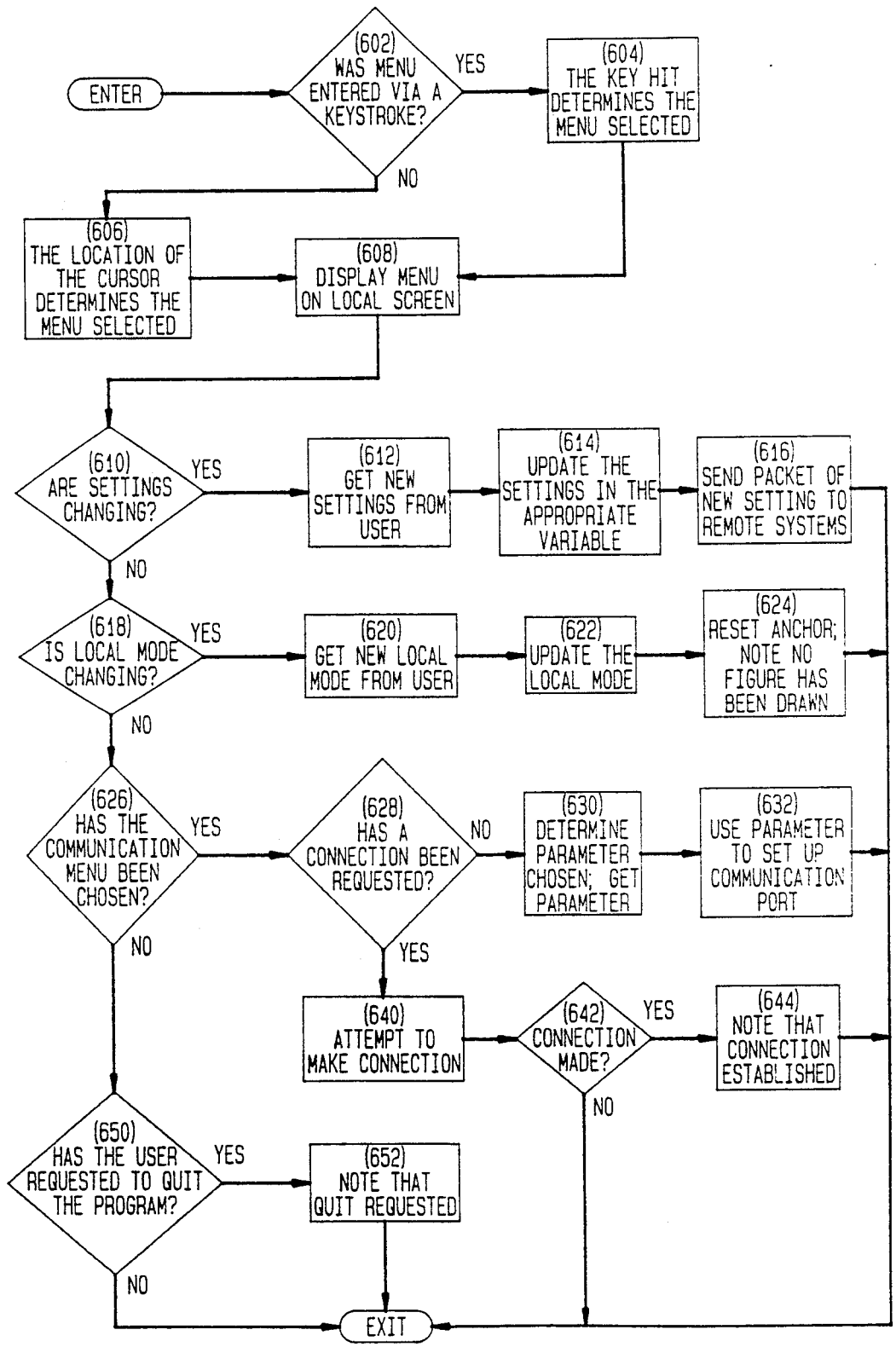

FIG. 10 depicts the menu service routine. The routine begins by testing whether the menu was entered via a keystroke (box 602). If so, the key that was hit determines the menu selected (box 604). Otherwise, the location of the cursor determines the menu (box 606). That menu is displayed on the display screen, the user chooses an item on the menu, and this is read by the program (box 608). The program then tests if any settings are to be changed (box 610). If so, it gets the new settings from the user (box 612), updates the settings in the appropriate variable (box 614) and sends a packet specifying a new setting to the remote terminal(s) (box 616).

If the settings aren't changed, the routine tests if the mode has been changed (box 618). If so, it notes a new local system mode (box 622), resets the anchor point (box 624) and exits the menu service routine.

Next, the routine tests if it is a communications menu (box 626). If it is, the program checks whether a connection to a remote system has been requested (box 628). If it has, it attempts to make the connection (box 640) and checks if a connection was successful (box 642). If it was successful, it notes this (box 644) and exits the routine.

If a connection has not been requested, the program instead gets a parameter with which to later establish a connection (630), which it stores (632).

Finally, if the communication menu has not been chosen, the routine tests if the user has asked to quit the program (box 650). If so, it notes the request (box 652) and exits the routine.

As will be apparent to those skilled in the art, numerous modifications may be made in the above-described apparatus and sequence of operation which are within the spirit and scope of the invention. Different terminals may be used with different input devices and different types of display screens and display screen controllers. Different programs may be used at the different terminals as long as the programs are able to provide the functions of displaying both information input from the local terminal and information input from the remote terminal(s) at the correct places on the display screen. All manner of variations may also be made in the generation and processing of signals by this equipment.

What is claimed is:

1. A communication system for creating substantially identical simultaneously interactive displays at a plurality of locations comprising:

a first terminal at a first of said locations comprising a first interactive display means, a first local input means for input of information to be displayed by said first display means, a first communications buffer for receiving information from a communication line, and a first means for transmitting information to a second location via the communication line, a functionally similar second terminal at a second of said locations comprising a second interactive display means, a second local input means for input of information to be displayed by said second display means, a second communications buffer for receiving information from said communication line, and a second means for transmitting information to said first location via said communication line, means at said first terminal for continuously receiving display instructions from said first input means and said first communication buffer and for implementing such instructions on said first display means upon receipt thereof, said instructions specifying a change in the information to be displayed by said display means and a location of said change in the information displayed, means at said first terminal for communicating display instructions entered at said first input means to the communications buffer of the second terminal via the communication line, said instructions being communicated upon receipt from said first input means, said instructions specifying a change in the information to be displayed by the second display means and a location of said change in the information displayed, means at said second terminal for continuously receiving display instructions from said second input means and said second communication buffer and for implementing such instructions on said second display means upon receipt thereof, said instructions specifying a change in the information to be displayed by said display means and a location of said change in the information displayed, and means at said second terminal for communicating display instructions entered at said second input means to the communications buffer of the first terminal via the communication line, said instructions being communicated upon receipt from said second input means, said instructions specifying a change in the information to be displayed by the first display means and a location of said change in the information displayed, whereby the same display is generated and updated substantially simultaneously at each of said first and second terminals.

2. The communication system of claim 1 wherein the means at each terminal for continuously receiving display instructions from an input means and a communication buffer comprises means for polling said input means and communication buffer.

3. The communication system of claim 1 wherein display instructions are communicated from one terminal to another using message packets.

4. The communication system of claim 1 wherein display instructions are communicated from one terminal to another using message packets and the system further comprises:
   means at each terminal for assigning a number to each message packet transmitted to another terminal,
   means for storing the message packets transmitted from a terminal,
   means for checking for errors in the message packets received at a terminal,
   means for requesting that a message packet be sent again from a transmitting terminal if the error checking means at a receiving terminal detects an error in a received message packet, and
   means for retrieving a stored message packet upon receipt of a request for retransmission and for transmitting said packet again.

5. The communication system of claim 4 wherein the message packet includes at least three copies of the message packet number and the system further comprises means at each terminal for reading each copy of the message packet number and determining if one value of the message packet number appears a majority of times.

6. The communication system of claim 4 further comprising at least one additional terminal similar to the first and second terminals and communicating with said first and second terminals via said communication line wherein the message packet also includes at least three copies of an identification of the terminal from which the packet is transmitted and the system further comprises means at each terminal for reading each copy of the terminal identification and determining if one value of the terminal identification appears a majority of times.

7. The communication system of claim 1 wherein the first terminal and the second terminal are controlled by functionally similar programs each of which is executing asynchronously at a different one of the terminals.

8. A communication system for creating substantially identical simultaneously interactive displays at two locations comprising:
   a first terminal at a first of said locations comprising a first interactive display means, a first local input means for input of information to be displayed by said first display means, a first communications buffer for receiving information from a full-duplex communication line, and a first means for transmitting information via the full-duplex communication line,
   a functionally similar second terminal at a second of said locations comprising a second interactive display means, a second local input means for input of information to be displayed by said second display means, a second communications buffer for receiving information from said communication line, and a second means for transmitting information via said communication line,
   means at said first terminal for repeatedly polling said first input means and said first communication buffer for display instructions and for implementing such instructions on said first display means upon receipt thereof,
   means at said first terminal for communicating display instructions entered at said first input means to the communications buffer of the second terminal via the communication line,
   means at said second terminal for repeatedly polling said second input means and said second communication buffer for display instructions and for implementing such instructions on said second display means upon receipt thereof,
   means at said second terminal for communicating display instructions entered at said second input means to the communications buffer of the first terminal via the communication line,
   a central processor at said first terminal operating under a stored program and controlling said first display means, said first input means, said first communications buffer, said first transmitting means, said polling means, and said communicating means, and
   a central processor at said second terminal operating under a stored program and controlling said second display means, said second input means, said second communications buffer, said second transmitting means, said polling means, and said communicating means, said stored programs under which the first and second terminals operate being functionally similar,
   whereby the same display is generated and updated substantially simultaneously at each of said first and second terminals.

9. The communication system of claim 8 wherein display instructions are communicated from one terminal to another using message packets.

10. The communication system of claim 8 wherein display instructions are communicated from one terminal to another using message packets and the system further comprises:
    means at each terminal for assigning a number to each message packet transmitted to another terminal,
    means for storing the message packets transmitted from a terminal,
    means for checking for errors in the message packets received at a terminal,
    means for requesting that a message packet be sent again from a transmitting terminal if the error checking means at a receiving terminal detects an error in a received message packet, and
    means for retrieving a stored message packet upon receipt of a request for retransmission and for transmitting said packet again.

11. The communication system of claim 9 wherein the message packet includes at least three copies of the message packet number and the system further comprises means at each terminal for reading each copy of the message packet number and determining if one value of the message packet number appears a majority of times.

12. The communication system of claim 11 further comprising at least one additional terminal similar to the first and second terminals and communicating with said first and second terminals via said communication line wherein the message packet also includes at least three copies of an identification of the terminal from which the packet is transmitted and the system further comprises means at each terminal for reading each copy of the terminal identification and determining if one value of the terminal identification appears a majority of times.

13. The system of claim 8 wherein the display instructions transmitted from one terminal to another specify a change in the information to be displayed by a display means and a location of said change in the information displayed.

14. The system of claim 8 wherein the stored programs under which the first and second terminals operate are the same.

15. In a communication system comprising:
a first terminal at a first location comprising a first interactive display means, a first local input means for input of information to be displayed by said first display means, a first communications buffer for receiving information from a communication line, and a first means for transmitting information to a second location via the communication line,
a functionally similar second terminal at a second location comprising a second interactive display means, a second local input means for input of information to be displayed by said second display means, a second communications buffer for receiving information from said communication line, and a second means for transmitting information to said first location via said communication line,
a method of creating substantially identical simultaneously interactive displays at the two locations comprising the steps of:
continuously receiving display instructions at said first terminal from said first input means and said first communication buffer and implementing such instructions on said first display means upon receipt thereof, said instructions specifying a change in the information to be displayed by said display means and a location of said change in the information displayed,
communicating display instructions entered at said first input means to the communications buffer of the second terminal via the communication line, said instructions being communicated upon receipt from said first input means, said instructions specifying a change in the information to be displayed by the second display means and a location of said change in the information displayed,
continuously receiving display instructions at said second terminal from said second input means and said second communication buffer and implementing such instructions on said second display means upon receipt thereof, said instructions specifying a change in the information to be displayed by said display means and a location of said change in the information displayed, and
communicating display instructions entered at said second input means to the communications buffer of the first terminal via the communication line, said instructions being communicated upon receipt from said second input means, said instructions specifying a change in the information to be displayed by the first display means and a location of said change in the information displayed,
whereby the same display is generated and updated substantially simultaneously at each of said first and second terminals.

16. The method of claim 15 wherein the step of continuously receiving display instructions from an input means and a communication buffer comprises the step of polling said input means and communication buffer.

17. The method of claim 15 wherein display instructions are communicated from one terminal to another using message packets.

18. The method of claim 15 wherein display instructions are communicated from one terminal to another using message packets and the method further comprises the steps of:
assigning at each terminal a number to each message packet transmitted to another terminal,
storing the message packets transmitted from a terminal,
checking for errors in the message packets received at a terminal,
requesting that a message packet be sent again from a transmitting terminal if an error checking means at a receiving terminal detects an error in a received message packet,
retrieving a stored message packet upon receipt of a request for retransmission, and
transmitting said packet again.

19. The method of claim 18 wherein the message packet includes at least three copies of the message packet number and the method further comprises the steps of reading each copy of the message packet number and determining if one value of the message packet number appears a majority of times.

20. The method of claim 19 wherein at least one additional terminal similar to the first and second terminals communicates with said first and second terminals via said communication line and the message packet also includes at least three copies of an identification of the terminal from which the packet is transmitted and the method further comprises the steps of reading each copy of the terminal identification and determining if one value of the terminal identification appears a majority of times.

21. The method of claim 15 wherein the first terminal and the second terminal are controlled by functionally similar programs each of which is executing asynchronously at a different one of the terminals.

22. A communication system for creating substantially identical simultaneously interactive displays at a plurality of locations comprising:
a first terminal at a first of said locations comprising a first interactive display means, a first local input means for input of information to be displayed by said first display means, a first communications buffer for receiving information from a communication line, and a first means for transmitting information to a second location via the communication line,
a second terminal at a second of said locations comprising a second interactive display means, a second local input means for input of information to be displayed by said second display means, a second communications buffer for receiving information from said communication line, and a second means for transmitting information to said first location via said communication line,
means at said first terminal for continuously receiving display instructions from said first input means and said first communication buffer and for implementing such instructions on said first display means upon receipt thereof, said instructions specifying a change in the information to be displayed by said display means and a location of said change in the information displayed, and said means for continuously receiving display instructions comprising a means for polling said first input means and said first communication buffer, means at said first terminal for communicating display instructions entered at said first input means to the communications buffer of the second terminal via the communication line, said instructions being communicated upon receipt from said first input means, said instructions specifying a change in the information to be displayed by the second display means and a location of said change in the information displayed, means at said second terminal for continuously receiving display instructions from said second input means and said second communication buffer and for implementing such instructions on said second display means upon receipt thereof, said instructions specifying a change in the information to be displayed by said display means and a location of said change in the information displayed, and said second means for continuously receiving display instructions comprising a means for polling said second input means and said second communication buffer, and means at said second terminal for communicating display instructions entered at said second input means to the communications buffer of the first terminal via the communication line, said instructions being communicated upon receipt from said second input means, said instructions specifying a change in the information to be displayed by the first display means and a location of said change in the information displayed, whereby the same display is generated and updated substantially simultaneously at each of said first and second terminals.

23. A communication system which utilizes message packets for creating substantially identical simultaneously interactive displays at a plurality of locations comprising:

a first terminal at a first of said locations comprising a first interactive display means, a first local input means for input of information to be displayed by said first display means, a first communications buffer for receiving information from a communication line, and a first means for transmitting information to a second location via the communication line, a second terminal at a second of said locations comprising a second interactive display means, a second local input means for input of information to be displayed by said second display means, a second communications buffer for receiving information from said communication line, and a second means for transmitting information to said first location via said communication line, means at said first terminal for continuously receiving display instructions from said first input means and said first communication buffer and for implementing such instructions on said first display means upon receipt thereof, said instructions specifying a change in the information to be displayed by said display means and a location of said change in the information displayed, means at said first terminal for communicating in message packets display instructions entered at said first input means to the communications buffer of the second terminal via the communication line, said instructions being communicated upon receipt from said first input means, said instructions specifying a change in the information to be displayed by the second display means and a location of said change in the information displayed, means at said second terminal for continuously receiving display instructions from said second input means and said second communication buffer and for implementing such instructions on said second display means upon receipt thereof, said instructions specifying a change in the information to be displayed by said display means and a location of said change in the information displayed, and means at said second terminal for communicating in message packets display instructions entered at said second input means to the communications buffer of the first terminal via the communication line, said instructions being communicated upon receipt from said second input means, said instructions specifying a change in the information to be displayed by the first display means and a location of said change in the information displayed, whereby the same display is generated and updated substantially simultaneously at each of said first and second terminals.

24. A communication system which utilizes message packets for creating substantially identical simultaneously interactive displays at a plurality of locations comprising:

a first terminal at a first of said locations comprising a first interactive display means, a first local input means for input of information to be displayed by said first display means, a first communications buffer for receiving information from a communication line, and a first means for transmitting message packets to a second location via the communication line, a second terminal at a second of said locations comprising a second interactive display means, a second local input means for input of information to be displayed by said second display means, a second communications buffer for receiving information from said communication line, and a second means for transmitting message packets to said first location via said communication line, means at said first terminal for continuously receiving display instructions from said first input means and said first communication buffer and for implementing such instructions on said first display means upon receipt thereof, said instructions specifying a change in the information to be displayed by said display means and a location of said change in the information displayed, means at said first terminal for communicating in message packets display instructions entered at said first input means to the communications buffer of the second terminal via the communication line, said instructions being communicated upon receipt from said first input means, said instructions specifying a change in the information to be displayed by the second display means and a location of said change in the information displayed, means at said second terminal for continuously receiving display instructions from said second input means and said second communication buffer and for implementing such instructions on said second display means upon receipt thereof, said instructions specifying a change in the information to be displayed by said display means and a location of said change in the information displayed, means at said second terminal for communicating in message packets display instructions entered at said second input means to the communications buffer of the first terminal via the communication line, said instructions being communicated upon receipt from said second input means, said instructions specifying a change in the information to be displayed by the first display means and a location of said change in the information displayed, means at each terminal for assigning a number to each message packet transmitted to another terminal, means for storing the message packets transmitted from a terminal, means for checking for errors in the message packets received at a terminal, means for requesting that a message packet be sent again from a transmitting terminal if the error checking means at a receiving terminal detects an error in a received message packet, and means for retrieving a stored message packet upon receipt of a request for retransmission and for transmitting said packet again, whereby the same display is generated and updated substantially simultaneously at each of said first and second terminals.

25. The communication system of claim 24 wherein the message packet includes at least there copies of the message packet number and the system further comprises means at each terminal for reading each copy of the message packet number and determining if one value of the message packet number appears a majority of times.

26. The communication system of claim 23 further comprising at least one additional terminal similar to the first and second terminals and communicating with said first and second terminals via said communication line wherein the message packet also includes at least three copies of an identification of the terminal from which the packet is transmitted and the system further comprises means at each terminal for reading each copy of the terminal identification and determining if one value of the terminal identification appears a majority of times.

27. A communication system for creating substantially identical simultaneously interactive displays at a plurality of locations comprising:

a first terminal at a first of said locations comprising a first interactive display means, a first local input means for input of information to be displayed by said first display means, a first communications buffer for receiving information from a communication line, and a first means for transmitting information to a second location via the communication line, a second terminal at a second of said locations comprising a second interactive display means, a second local input means for input of information to be displayed by said second display means, a second communications buffer for receiving information from said communication line, and a second means for transmitting information to said first location via said communication line, means at said first terminal for continuously receiving display instructions from said first input means and said first communication buffer and for implementing such instructions on said first display means upon receipt thereof, said instructions specifying a change in the information to be displayed by said display means and a location of said change in the information displayed, means at said first terminal for communicating display instructions entered at said first input means to the communications buffer of the second terminal via the communication line, said instructions being communicated upon receipt from said first input means, said instructions specifying a change in the information to be displayed by the second display means and a location of said change in the information displayed, means at said second terminal for continuously receiving display instructions from said second input means and said second communication buffer and for implementing such instructions on said second display means upon receipt thereof, said instructions specifying a change in the information to be displayed by said display means and a location of said change in the information displayed, and means at said second terminal for communicating display instructions entered at said second input means to the communications buffer of the first terminal via the communication line, said instructions being communicated upon receipt from said second input means, said instructions specifying a change in the information to be displayed by the first display means and a location of said change in the information displayed, and functionally similar programs controlling said first and second terminals, each of which programs is executing asynchronously at a different one of the terminals, whereby the same display is generated and updated substantially simultaneously at each of said first and second terminals.

28. A communication system for creating substantially identical simultaneously interactive displays at two locations comprising:

a first terminal at a first of said locations comprising a first interactive display means, a first local input means for input of information to be displayed by said first display means, a first communications buffer for receiving information from a full-duplex communication line, a first means for generating display instructions formed of message packets, and a first means for transmitting information via the full-duplex communication line, a second terminal at a second of said locations comprising a second interactive display means, a second local input means for input of information to be displayed by said second display means, a second communications buffer for receiving information from said communication line, a second means for generating display instructions formed of message packets, and a second means for transmitting information via said communication line, means at said first terminal for repeatedly polling said first input means and said first communication buffer for display instructions and for implementing such instructions on said first display means upon receipt thereof, means at said first terminal for communicating in message packets display instructions entered at said first input means to the communications buffer of the second terminal via the communication line, means at said second terminal for repeatedly polling said second input means and said second communication buffer for display instructions and for implementing such instructions on said second display means upon receipt thereof, means at said second terminal for communicating in message packets display instructions entered at said second input means to the communications buffer of the first terminal via the communication line, a central processor at said first terminal operating under a stored program and controlling said first display means, said first input means, said first communications buffer, said first transmitting means, said polling means, and said communicating means, and a central processor at said second terminal operating under a stored program and controlling said second display means, said second input means, said second communications buffer, said second transmitting means, said polling means, and said communicating means, said stored programs under which the first and second terminals operate being functionally similar, whereby the same display is generated and updated substantially simultaneously at each of said first and second terminals.

29. A communication system for creating substantially identical simultaneously interactive displays at two locations comprising:

a first terminal at a first of said locations comprising a first interactive display means, a first local input means for input of information to be displayed by said first display means, a first communications buffer for receiving information from a full-duplex communication line, a first means for generating display instructions formed of message packets, and a first means for transmitting message packets via the full-duplex communication line, a second terminal at a second of said locations comprising a second interactive display means, a second local input means for input of information to be displayed by said second display means, a second communications buffer for receiving information from said communication line, a second means for generating display instructions formed of message packets, a second means for generating display instructions formed of message packets, and a second means for transmitting message packets via said communication line, means at said first terminal for repeatedly polling said first input means and said first communication buffer for display instructions and for implementing such instructions on said first display means upon receipt thereof, means at said first terminal for communicating in message packets display instructions entered at said first input means to the communications buffer of the second terminal via the communication line, means at said second terminal for repeatedly polling said second input means and said second communication buffer for display instructions and for implementing such instructions on said second display means upon receipt thereof, means at said second terminal for communicating in message packets display instructions entered at said second input means to the communications buffer of the first terminal via the communication line, a central processor at said first terminal operating under a stored program and controlling said first display means, said first input means, said first communications buffer, said first transmitting means, said polling means, and said communicating means, a central processor at said second terminal operating under a stored program and controlling said second display means, said second input means, said second communications buffer, said second transmitting means, said polling means, and said communicating means, said stored programs under which the first and second terminals operate being functionally similar, means at each terminal for assigning a number to each message packet transmitted to another terminal, means for storing the message packets transmitted from a terminal, means for checking for errors in the message packets received at a terminal, means for requesting that a message packet be sent again from a transmitting terminal if the error checking means at a receiving terminal detects an error in a received message packet, and means for retrieving a stored message packet upon receipt of a request for retransmission and for transmitting said packet again, whereby the same display is generated and updated substantially simultaneously at each of said first and second terminals.

30. The communication system of claim 29 wherein the message packet includes at least three copies of the message packet number and the system further comprises means at each terminal for reading each copy of the message packet number and determining if one value of the message packet number appears a majority of times.

31. The communication system of claim 28 further comprising at least one additional terminal similar to the first and second terminals and communicating with said first and second terminals via said communication line wherein the message packet also includes at least three copies of an identification of the terminal from which the packet is transmitted and the system further comprises means at each terminal for reading each copy of the terminal identification and determining if one value of the terminal identification appears a majority of times.

32. A communication system for creating substantially identical simultaneously interactive displays at two locations comprising:

first terminal at a first of said locations comprising a first interactive display means, a first local input means for input of information to be displayed by said first display means, a first communications buffer for receiving information from a full-duplex communication line, and a first means for transmitting information via the full-duplex communication line, a second terminal at a second of said locations comprising a second interactive display means, a second local input means for input of information to be displayed by said second display means, a second communications buffer for receiving information from said communication line, and a second means for transmitting information via said communication line, means at said first terminal for repeatedly polling said first input means and said first communication buffer for display instructions and for implementing such instructions on said first display means upon receipt thereof, said instructions specifying a change in the information to be displayed by said display means and a location of said change in the information displayed, means at said first terminal for communicating display instructions entered at said first input means to the communications buffer of the second terminal via the communication line, said instructions specifying a change in the information to be displayed by said display means and a location of said change in the information displayed, means at said second terminal for repeatedly polling said second input means and said second communication buffer for display instructions and for implementing such instructions on said second display means upon receipt thereof, said instructions specifying a change in the information to be displayed by said display means and a location of said change in the information displayed, means at said second terminal for communicating display instructions entered at said second input means to the communications buffer of the first terminal via the communication line, said instructions specifying a change in the information to be displayed by said display means and a location of said change in the information displayed, a central processor at said first terminal operating under a stored program and controlling said first display means, said first input means, said first communications buffer, said first transmitting means, said polling means, and said communicating means, and a central processor at said second terminal operating under a stored program and controlling said second display means, said second input means, said second communications buffer, said second transmitting means, said polling means, and said communicating means, said stored programs under which the first and second terminals operate being functionally similar, whereby the same display is generated and updated substantially simultaneously at each of said first and second terminals.

33. A communication system for creating substantially identical simultaneously interactive displays at two locations comprising:

a first terminal at a first of said locations comprising a first interactive display means, a first local input means for input of information to be displayed by said first display means, a first communications buffer for receiving information from a full-duplex communication line, and a first means for transmitting information via the full-duplex communication line, a second terminal at a second of said locations comprising a second interactive display means, a second local input means for input of information to be displayed by said second display means, a second communications buffer for receiving information from said communication line, and a second means for transmitting information via said communication line, means at said first terminal for repeatedly polling said first input means and said first communication buffer for display instructions and for implementing such instructions on said first display means upon receipt thereof, means at said first terminal for communicating display instructions entered at said first input means to the communications buffer of the second terminal via the communication line, means at said second terminal for repeatedly polling said second input means and said second communication buffer for display instructions and for implementing such instructions on said second display means upon receipt thereof, means at said second terminal for communicating display instructions entered at said second input means to the communications buffer of the first terminal via the communication line, a central processor at said first terminal operating under a stored program and controlling said first display means, said first input means, said first communications buffer, said first transmitting means, said polling means, and said communicating means, and a central processor at said second terminal operating under a stored program and controlling said second display means, said second input means, said second communications buffer, said second transmitting means, said polling means, and said communicating means, said stored programs under which the first and second terminals operate being the same, whereby the same display is generated and updated substantially simultaneously at each of said first and second terminals.

34. In a communication system comprising:

a first terminal at a first location comprising a first interactive display means, a first local input means for input of information to be displayed by said first display means, a first communications buffer for receiving information from a communication line, and a first means for transmitting information to a second location via the communication line, and a second terminal at a second location comprising a second interactive display means, a second local input means for input of information to be displayed by said second display means, a second communications buffer for receiving information from said communication line, and a second means for transmitting information to said first location via said communication line, a method of creating substantially identical simultaneously interactive displays at the two locations comprising the steps of:

polling said first input means and said first communication buffer to continuously receive display instructions therefrom and implementing such instructions on said first display means upon receipt thereof, said instructions specifying a change in the information to be displayed by said display means and a location of said change in the information displayed, communicating display instructions entered at said first input means to the communications buffer of the second terminal via the communication line, said instructions being communicated upon receipt from said first input means, said instructions specifying a change in the information to be displayed by the second display means and a location of said change in the information displayed, polling said second input means and said second communication buffer to continuously receive display instructions therefrom and implementing such instructions on said second display means upon receipt thereof, said instructions specifying a change in the information to be displayed by said display means and a location of said change in the information displayed, and communicating display instructions entered at said second input means to the communications buffer of the first terminal via the communication line, said instructions being communicated upon receipt from said second input means, said instructions specifying a change in the information to be displayed by the first display means and a location of said change in the information displayed, whereby the same display is generated and updated substantially simultaneously at each of said first and second terminals.

35. In a communication system comprising:

a first terminal at a first location comprising a first interactive display means, a first local input means for input of information to be displayed by said first display means, a first communications buffer for receiving information from a communication line, and a first means for transmitting information to a second location via the communication line, and a second terminal at a second location comprising a second interactive display means, a second local input means for input of information to be displayed by said second display means, a second communications buffer for receiving information from said communication line, and a second means for transmitting information to said first location via said communication line, a method of creating substantially identical simultaneously interactive displays at the two locations comprising the steps of:

continuously receiving display instructions at said first terminal from said first input means and said first communication buffer and implementing such instructions on said first display means upon receipt thereof, said instructions specifying a change in the information to be displayed by said display means and a location of said change in the information displayed, communicating in message packets display instructions entered at said first input means to the communications buffer of the second terminal via the communication line, said instructions being communicated upon receipt from said first input means, said instructions specifying a change in the information to be displayed by the second display means and a location of said change in the information displayed, continuously receiving display instructions at said second terminal from said second input means and said second communication buffer and implementing such instructions on said second display means upon receipt thereof, said instructions specifying a change in the information to be displayed by said display means and a location of said change in the information displayed, and communicating in message packets display instructions entered at said second input means to the communications buffer of the first terminal via the communication line, said instructions being communicated upon receipt from said second input means, said instructions specifying a change in the information to be displayed by the first display means and a location of said change in the information displayed, whereby the same display is generated and updated substantially simultaneously at each of said first and second terminals.

36. In a communication system comprising:

a first terminal at a first location comprising a first interactive display means, a first local input means for input of information to be displayed by said first display means, a first communications buffer for receiving information from a communication line, and a first means for transmitting message packets to a second location via the communication line, and a second terminal at a second location comprising a second interactive display means, a second local input means for input of information to be displayed by said second display means, a second communications buffer for receiving information from said communication line, and a second means for transmitting message packets to said first location via said communication line, a method of creating substantially identical simultaneously interactive displays at the two locations comprising the steps of:

continuously receiving display instructions at said first terminal from said first input means and said first communication buffer and implementing such instructions on said first display means upon receipt thereof, said instructions specifying a change in the information to be displayed by said display means and a location of said change in the information displayed, communicating in message packets display instructions entered at said first input means to the communications buffer of the second terminal via the communication line, said instructions being communicated upon receipt from said first input means, said instructions specifying a change in the information to be displayed by the second display means and a location of said change in the information displayed, continuously receiving display instructions at said second terminal from said second input means and said second communication buffer and implementing such instructions on said second display means upon receipt thereof, said instructions specifying a change in the information to be displayed by said display means and a location of said change in the information displayed, communicating in message packets display instructions entered at said second input means to the communications buffer of the first terminal via the communication line, said instructions being communicated upon receipt from said second input means, said instructions specifying a change in the information to be displayed by the first display means and a location of said change in the information displayed, assigning at each terminal a number to each message packet transmitted to another terminal, storing the message packets transmitted from a terminal, checking for errors in the message packets received at a terminal, requesting that a message packet be sent again from a transmitting terminal if an error checking means at a receiving terminal detects an error in a received message packet, retrieving a stored message packet upon receipt of a request for retransmission, and transmitting said packet again, whereby the same display is generated and updated substantially simultaneously at each of said first and second terminals.

37. The method of claim 36 wherein the message packet includes at least three copies of the message packet number and the method further comprises the steps of reading each copy of the message packet number and determining if one value of the message packet number appears a majority of times.

38. The method of claim 35 wherein at least one additional terminal similar to the first and second terminals communicates with said first and second terminals via said communication line and the message packet also includes at least three copies of an identification of the terminal from which the packet is transmitted and the method further comprises the steps of reading each copy of the terminal identification and determining if one value of the terminal identification appears a majority of times.

39. In a communication system comprising:

a first terminal at a first location comprising a first interactive display means, a first local input means for input of information to be displayed by said first display means, a first communications buffer for receiving information from a communication line, and a first means for transmitting information to a second location via the communication line, and a second terminal at a second location comprising a second interactive display means, a second local input means for input of information to be displayed by said second display means, a second communications buffer for receiving information from said communication line, and a second means for transmitting information to said first location via said communication line, a method of creating substantially identical simultaneously interactive displays at the two locations comprising the steps of:

continuously receiving display instructions at said first terminal from said first input means and said first communication buffer and implementing such instructions on said first display means upon receipt thereof, said instructions specifying a change in the information to be displayed by said display means and a location of said change in the information displayed, communicating display instructions entered at said first input means to the communications buffer of the second terminal via the communication line, said instructions being communicated upon receipt from said first input means, said instructions specifying a change in the information to be displayed by the second display means and a location of said change in the information displayed, continuously receiving display instructions at said second terminal from said second input means and said second communication buffer and implementing such instructions on said second display means upon receipt thereof, said instructions specifying a change in the information to be displayed by said display means and a location of said change in the information displayed, and communicating display instructions entered at said second input means to the communications buffer of the first terminal via the communication line, said instructions being communicated upon receipt from said second input means, said instructions specifying a change in the information to be displayed by the first display means and a location of said change in the information displayed, wherein said first and second terminals are controlled by functionally similar programs each of which is executing asynchronously at a different one of the terminals, whereby the same display is generated and updated substantially simultaneously at each of said first and second terminals.

40. A communication system for operating at a plurality of locations comprising:

a first terminal at a first of said locations comprising a first interactive display means, a first local input means for input of information to be displayed by said first display means, a first communications buffer for receiving information from a communication line, and a first means for transmitting information to a second location via the communication line, a functionally similar second terminal at a second of said locations comprising a second interactive display means, a second local input means for input of information to be displayed by said second display means, a second communications buffer for receiving information from said communication line, and a second means for transmitting information to said first location via said communication line, means at said first terminal for continuously receiving display instructions from said first input means and said first communication buffer and for implementing such instructions upon receipt thereof, said instructions specifying a change in the information to be displayed by the first display means and a location of said change in the information to be displayed, means at said first terminal for communicating display instructions entered at said first input means to the communications buffer of the second terminal via the communication line, said instructions being communicated upon receipt from said first input means, said instructions specifying a change in the information to be displayed by the second display means and a location of said change in the information to be displayed, means at said second terminal for continuously receiving display instructions from said second input means and said second communication buffer and for implementing such instructions upon receipt thereof, said instructions specifying a change in the information to be displayed by the second display means and a location of said change in the information to be displayed, and means at said second terminal for communicating display instructions entered at said second input means to the communications buffer of the first terminal via the communication line, said instructions being communicated upon receipt from said second input means, said instructions specifying a change in the information to be displayed by the first display means and a location of said change in the information to be displayed, whereby the same information is generated and updated substantially simultaneously at each of said first and second terminals.

41. A communication system for operating at two locations comprising:

a first terminal at a first of said locations comprising a first interactive display means, a first local input means for input of information to be displayed by said first display means, a first communications buffer for receiving information from a full-duplex communication line, and a first means for transmitting information via the full-duplex communication line, a functionally similar second terminal at a second of said locations comprising a second interactive display means, a second local input means for input of information to be displayed by said second display means, a second communications buffer for receiving information from said communication line, and a second means for transmitting information via said communication line, means at said first terminal for repeatedly polling said first input means and said first communication buffer for display instructions and for implementing such instructions upon receipt thereof, means at said first terminal for communicating display instructions entered at said first input means to the communications buffer of the second terminal via the communication line, means at said second terminal for repeatedly polling said second input means and said second communication buffer for display instructions and for implementing such instructions upon receipt thereof, means at said second terminal for communicating display instructions entered at said second input means to the communications buffer of the first terminal via the communication line, a central processor at said first terminal operating under a stored program and controlling said first display means, said first input means, said first communications buffer, said first transmitting means, said polling means, and said communicating means, a central processor at said second terminal operating under a stored program and controlling said second display means, said second input means, said second communications buffer, said second transmitting means, said polling means, and said communicating means, said stored programs under which the first and second terminals operate being functionally similar, whereby the same information is generated and updated substantially simultaneously at each of said first and second terminals.

42. In a communication system comprising:

a first terminal at a first location comprising a first interactive display means, a first local input means for input of information to be displayed by said first display means, a first communications buffer for receiving information from a communication line, and a first means for transmitting information to a second location via the communication line, a functionally similar second terminal at a second location comprising a second interactive display means, a second local input means for input of information to be displayed by said second display means, a second communications buffer for receiving information from said communication line, and a second means for transmitting information to said first location via said communication line, a method of generating substantially identical information at the two locations comprising the steps of:

continuously receiving display instructions at said first terminal from said first input means and said first communication buffer and implementing such instructions upon receipt thereof, said instructions specifying a change in the information to be displayed, and a location of said change in the information to be displayed, communicating display instructions entered at said first input means to the communications buffer of the second terminal via the communication line, said instructions being communicated upon receipt from said first input means, said instructions specifying a change in the information to be displayed by the second display means and a location of said change in the information to be displayed, continuously receiving display instructions at said second terminal from said second input means and said second communication buffer and implementing such instructions upon receipt thereof, said instructions specifying a change in the information to be displayed and a location of said change in the information to be displayed, and communicating display instructions entered at said second input means to the communications buffer of the first terminal via the communication line, said instructions being communicated upon receipt from said second input means, said instructions specifying a change in the information to be displayed by the first display means and a location of said change in the information to be displayed, whereby the same information is generated and updated substantially simultaneously at each of said first and second terminals.

* * * * *